United States Patent
Kim et al.

(10) Patent No.: US 9,063,793 B2
(45) Date of Patent: Jun. 23, 2015

(54) VIRTUAL SERVER AND VIRTUAL MACHINE MANAGEMENT METHOD FOR SUPPORTING ZERO CLIENT BY PROVIDING HOST INTERFACES FROM CLASSIFIED RESOURCE POOLS THROUGH EMULATION OR DIRECT CONNECTION MODES

(75) Inventors: Hak-Jae Kim, Daejeon (KR); Sun-Wook Kim, Hwaseong-si (KR); Dae-Won Kim, Daejeon (KR); Seong-Woon Kim, Gyeryong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 217 days.

(21) Appl. No.: 13/474,214

(22) Filed: May 17, 2012

(65) Prior Publication Data

US 2012/0297382 A1 Nov. 22, 2012

(30) Foreign Application Priority Data

May 18, 2011 (KR) ......................... 10-2011-0046913
Oct. 19, 2011 (KR) ......................... 10-2011-0107125

(51) Int. Cl.
G06F 15/173 (2006.01)
G06F 15/16 (2006.01)
G06F 9/50 (2006.01)

(52) U.S. Cl.
CPC ................................. *G06F 9/5077* (2013.01)

(58) Field of Classification Search
None
See application file for complete search history.

(56) References Cited

U.S. PATENT DOCUMENTS

| | | | | |
|---|---|---|---|---|
| 5,062,037 A * | 10/1991 | Shorter et al. | ................ | 718/100 |
| 7,536,688 B2 * | 5/2009 | Tene et al. | .......................... | 718/1 |
| 7,613,847 B2 * | 11/2009 | Kjos et al. | ........................ | 710/22 |
| 7,669,202 B1 * | 2/2010 | Tene et al. | .......................... | 718/1 |
| 8,589,554 B2 * | 11/2013 | Kelkar et al. | ................. | 709/226 |
| 2005/0246453 A1 | 11/2005 | Erlingsson et al. | | |
| 2007/0083660 A1 * | 4/2007 | Thornton | ...................... | 709/227 |
| 2008/0126547 A1 * | 5/2008 | Waldspurger | ................. | 709/226 |
| 2008/0155169 A1 * | 6/2008 | Hiltgen et al. | ..................... | 711/6 |
| 2008/0294808 A1 | 11/2008 | Mahalingam et al. | | |
| 2009/0006537 A1 | 1/2009 | Palekar et al. | | |
| 2009/0119087 A1 * | 5/2009 | Ang et al. | ........................ | 703/23 |
| 2009/0276771 A1 * | 11/2009 | Nickolov et al. | ............. | 717/177 |
| 2010/0131624 A1 * | 5/2010 | Ferris | .............................. | 709/221 |
| 2010/0169948 A1 * | 7/2010 | Budko et al. | ...................... | 726/1 |
| 2010/0250824 A1 | 9/2010 | Belay | | |

FOREIGN PATENT DOCUMENTS

KR 10-2009-0018905 2/2009

* cited by examiner

*Primary Examiner* — Meng An
*Assistant Examiner* — Dar-Eaum Nam
(74) *Attorney, Agent, or Firm* — Staas & Halsey LLP

(57) ABSTRACT

Disclosed herein are a virtual server and a virtual machine management method for supporting a zero client. The virtual server includes a virtual machine management agent unit and a virtualization unit. The virtual machine management agent unit generates a virtual host interface resource pool and a directly allocatable host interface resource pool by classifying attributes of host interface resources of the virtual server. The virtualization unit provides a host interface of a virtual machine by selectively using any one of emulation mode in which a virtual host interface set corresponding to the virtual host interface resource pool is generated and direct connection mode in which a directly allocatable host interface set corresponding to the directly allocatable host interface resource pool is connected to the zero client.

16 Claims, 9 Drawing Sheets

VIRTUAL SERVER AND VIRTUAL MACHINE MANAGEMENT METHOD FOR SUPPORTING ZERO CLIENT BY PROVIDING HOST INTERFACES FROM CLASSIFIED RESOURCE POOLS THROUGH EMULATION OR DIRECT CONNECTION MODES

CROSS REFERENCE TO RELATED APPLICATIONS

This application claims the benefit of Korean Patent Application Nos. 10-2011-0046913, filed on May 18, 2011 and 10-2011-0107125, filed on Oct. 19, 2011, which are hereby incorporated by reference in their entirety into this application.

BACKGROUND OF THE INVENTION

1. Technical Field

The present invention relates generally to a virtual server and a virtual machine management method for supporting a zero client and, more particularly, to a virtual server and a virtual machine management method for supporting a zero client, which provide the host interface of a virtual machine by selectively using any one of emulation mode in which a shareable host interface set is emulated to generate a virtual host interface set and direct connection mode in which a directly allocatable host interface set is connected to the zero client, thus serving high-end level applications such as three-dimensional (3D) games, high-quality video, high-quality audio, and 3D graphic tasks.

2. Description of the Related Art

A method of generating a virtual host interface having a 1:N relation with a physical host interface so as to provide a unique physical host interface to a plurality of virtual machines in a server virtualization environment is referred to as "emulation mode." Here, an Operating System (OS) installed on each virtual machine recognizes a virtual host interface set generated by virtual software as its own host interface and is then operated by the virtual host interface set. Such virtualization technologies include CITRIX XenServer, MICROSOFT HYPER-V, VMWARE ESXi, ORACLE Virtual Box, GNU Open License-based Quick EMUlator (QEMU), etc.

However, in the case of a host interface that duplicates large-capacity data such as for a Video Graphics Array (VGA), a Universal Serial Bus (USB) device, or a sound device, or that requires the ability to exclusively use a processor for a relevant device, the load of the processor greatly increases and the performance of an application being executed using the host interface cannot be guaranteed when the device is being processed in emulation mode. Therefore, it is impossible to smoothly provide services such as high-end level applications (3D games, High Definition (HD)-level video, etc.) that are executed using such a host interface. Processor technologies, such as INTEL VT-d or AMD Input/Output Memory Management Unit (IOMMU), relate to a device for directly allocating host interfaces to virtual machines in a 1:1 manner, and the scheme of this device is called a direct allocation scheme. Therefore, virtual machines can smoothly serve high-end level applications by directly connecting some host interface devices to the virtual machines using such a device.

In order to provide a virtual desktop service in a server virtualization environment, Input/Output (I/O) signals of a virtual machine must be able to be represented or controlled by a remote client. Conventional technologies for processing I/O signals of a virtual machine include MICROSOFT Remote Desktop Protocol (RDP), CITRIX High Definition Experience (HDX), TERADICI PC over Internet Protocol (PCoIP), VMWARE VIEW, etc. In these technologies, I/O signals of a virtual desktop are transmitted in a digital format using a network protocol between a virtual machine and a client. Here, the client is equipped with a processor and is then configured to process the I/O network packets of the virtual machine and to represent the desktop of the virtual machine using its own host interface device. That is, the client has the form of a computer which includes a processor, a host interface, and an I/O device and on which an Operating System (OS) is installed.

Conventional methods for remote virtual desktop services in the virtualization environment are configured such that digital I/O signals of a virtual machine must be represented and controlled by a client using a network protocol. For this, the devices of the client must include a processor, a host interface, and an I/O device. Therefore, a problem arises in that the production cost of the client increases, and the load and the processing time of the processor occur because of having to generate network packets by attaching I/O signals of the virtual machine or having to extract I/O signals from network packets.

SUMMARY OF THE INVENTION

Accordingly, an object of the present invention is to provide a virtual server and a virtual machine management method for supporting a zero client, which provide the host interface of a virtual machine by selectively using any one of emulation mode in which a shareable host interface set is emulated to generate a virtual host interface set and direct connection mode in which a directly allocatable host interface set is connected to the zero client, thus serving high-end level applications such as 3D games, high-quality video, high-quality audio, and 3D graphic tasks.

In accordance with an aspect of the present invention to accomplish the above object, there is provided a virtual server for supporting a zero client, including a virtual machine management agent unit for generating a virtual host interface resource pool and a directly allocatable host interface resource pool by classifying attributes of host interface resources of the virtual server; and a virtualization unit for providing a host interface of a virtual machine by selectively using any one of emulation mode in which a virtual host interface set corresponding to the virtual host interface resource pool is generated and direct connection mode in which a directly allocatable host interface set corresponding to the directly allocatable host interface resource pool is connected to the zero client.

Preferably, the virtual machine management agent unit may be configured to generate a host interface resource pool by collecting host interface information of the virtual server, and generate the virtual host interface resource pool and the directly allocatable host interface resource pool by classifying attributes of the host interface resources in the generated host interface resource pool.

Preferably, the virtual machine management agent unit may be configured to generate the virtual host interface resource pool in response to information related to a virtual machine installed on the virtual server, and to generate the directly allocatable host interface resource pool in response to information related to a directly allocatable host interface installed on the virtual server.

Preferably, the virtual host interface resource pool may include information about one or more selected from a group consisting of a number of virtual processors that can be operated by the virtual server, a size of memory allocated to each zero client, a number of disk images of the virtual machine installed on the virtual server, a number of disk partitions of the virtual machine installed on the virtual server, and a number of virtual network devices that can be generated in the virtual server.

Preferably, the directly allocatable host interface resource pool may include one or more selected from a group consisting of information of a directly allocatable graphics processing device installed on the virtual server, information of a directly allocatable Universal Serial Bus (USB) device installed on the virtual server, information of a directly allocatable network device installed on the virtual server, and information of a directly allocatable sound device installed on the virtual server.

In accordance with another aspect of the present invention to accomplish the above object, there is provided a virtual machine management method for supporting a zero client, including generating, by a virtual server, a virtual host interface resource pool and a directly allocatable host interface resource pool by classifying attributes of host interface resources of the virtual server; receiving, by the virtual server, a virtual machine establishment instruction set corresponding to a virtual machine establishment request of a user from a virtual machine management master server; and providing a host interface of a virtual machine interface by selectively using any one of emulation mode in which a virtual host interface set corresponding to the virtual host interface resource pool is generated and direct connection mode in which a directly allocatable host interface set corresponding to the directly allocatable host interface resource pool is connected to the zero client.

Preferably, the generating the virtual host interface resource pool and the directly allocatable host interface resource pool may include generating a host interface resource pool by collecting host interface information of the virtual server; and generating the virtual host interface resource pool and the directly allocatable host interface resource pool by classifying attributes of the host interface resources in the host interface resource pool.

Preferably, the generating the virtual host interface resource pool and the directly allocatable host interface resource pool by classifying the attributes of the host interface resources in the host interface resource pool may include generating the virtual host interface resource pool in response to information related to a virtual machine installed on the virtual server; and generating the directly allocatable host interface resource pool in response to information related to a directly allocatable host interface installed on the virtual server.

Preferably, the generating the virtual host interface resource pool in response to the information related to the virtual machine installed on the virtual server may include calculating a number of operation cores of a processor installed on the virtual server and an operating speed of each operation core, thus calculating a number of virtual processors that can be operated by the virtual server; calculating a size of memory allocated to each zero client using a size of entire host memory installed on the virtual server; calculating a number of disk images of the virtual machine installed on the virtual server; calculating a number of disk partitions of the virtual machine installed on the virtual server; and calculating a number of virtual network devices that can be generated in the virtual server by calculating network bandwidth for each client of a network device installed on the virtual server.

Preferably, the generating the directly allocatable host interface resource pool in response to the information related to the directly allocatable host interface installed on the virtual server may include checking information of a directly allocatable graphics processing device installed on the virtual server; checking information of a directly allocatable Universal Serial Bus (USB) device installed on the virtual server; checking information of a directly allocatable network device installed on the virtual server; and checking information of a directly allocatable sound device installed on the virtual server.

Preferably, the virtual machine management method may further include receiving, by the virtual machine management master server, the virtual machine establishment request of the user; generating, by the virtual machine management master server, a virtual server group resource pool by collecting host interface resource information related to the virtual machine; generating, by the virtual machine management master server, a virtual machine establishment instruction set required to operate the zero client in accordance with the virtual server group resource pool; and transmitting, by the virtual machine management master server, the generated virtual machine establishment instruction set to the virtual server.

Preferably, the host interface resource information related to the virtual machine may be collected from the virtual host interface resource pool and the directly allocatable host interface resource pool of the virtual server.

Preferably, the generating the virtual machine establishment instruction set may include determining, by the virtual machine management master server, whether a host interface corresponding to the virtual machine establishment request of the user is usable in the virtual server group resource pool, and adding information about direct access to the host interface to the virtual machine establishment instruction set if it is determined that the host interface is usable.

Preferably, the virtual machine management method may further include if the virtual machine is generated using the virtual machine establishment instruction set, updating, by the virtual server, the virtual host interface resource pool and the directly allocatable host interface resource pool using information about host interface resources consumed in generating the virtual machine.

Preferably, the virtual machine management method may further include updating, by the virtual machine management master server, the virtual server group resource pool in accordance with the updated virtual host interface resource pool and the updated directly allocatable host interface resource pool.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
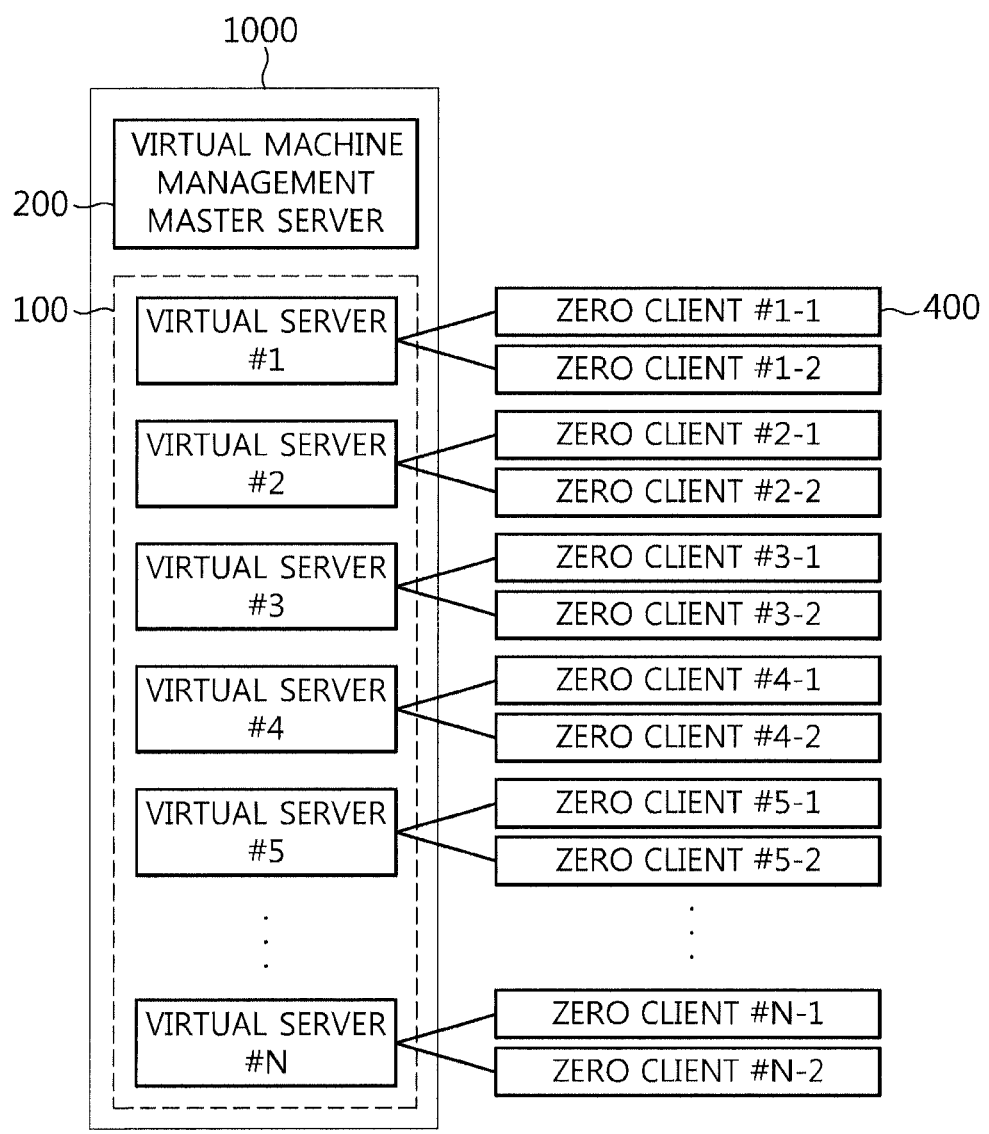
FIG. 1 is a diagram schematically showing a virtual server and a virtual machine management master server for supporting a zero client according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

FIG. 1 is a diagram schematically showing a virtual server and a virtual machine management master server for supporting a zero client according to an embodiment of the present invention.

Referring to FIG. 1, a virtual machine management server 1000 may include a group of virtual servers 100 and a virtual machine management master server 200 for managing the virtual servers 100. Each of the virtual servers 100 is connected to one or more zero clients 400 and is then capable of supporting the zero clients 400.

Each zero client 400 refers to a client composed of Input/Output (I/O) devices, and is advantageous in that the zero client can be constructed at low cost and it has a low processing load and fast processing speed because it does not include a host interface.

Figure 2:
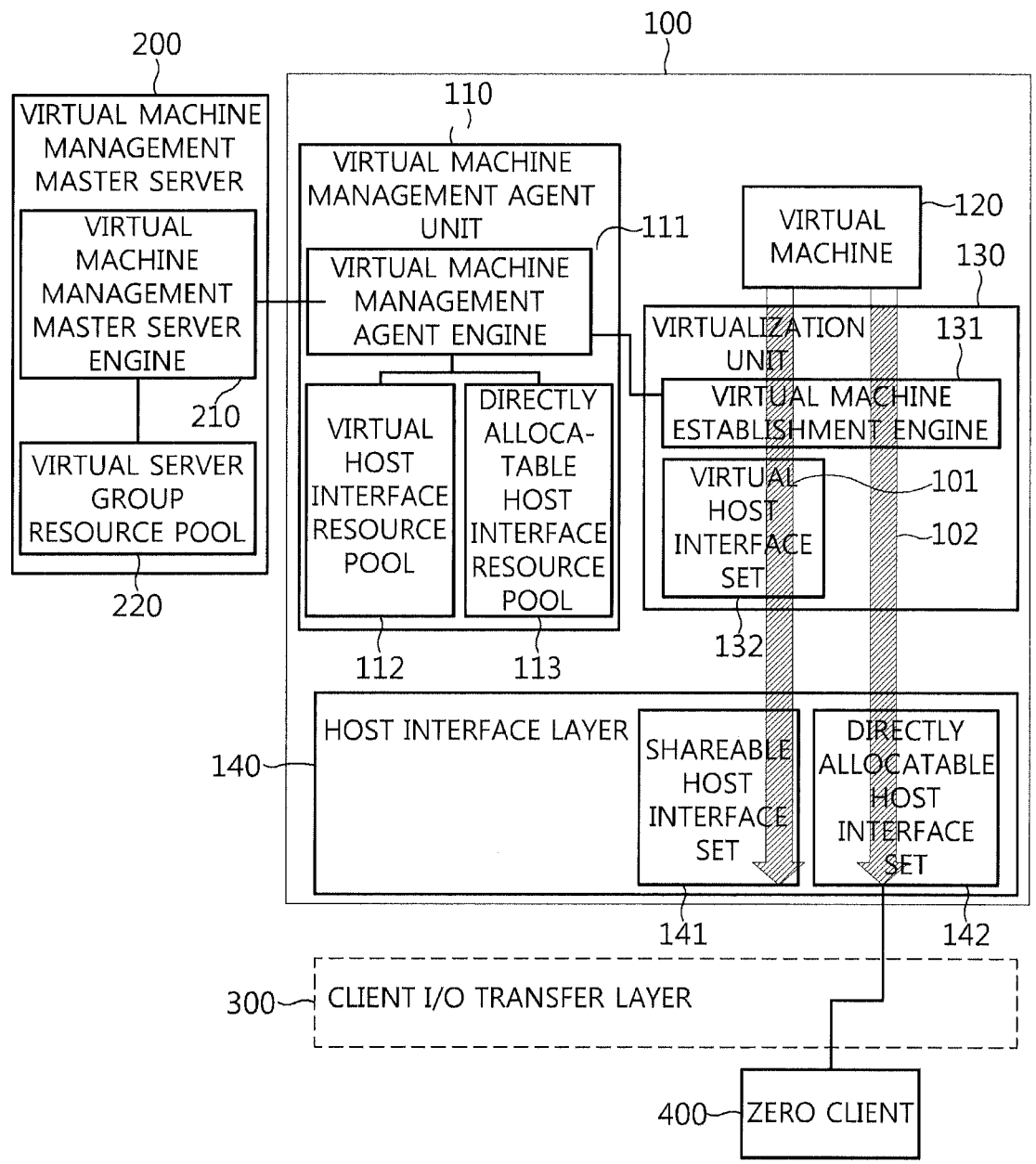
FIG. 2 is a diagram showing the configuration of the virtual server and the virtual machine management master server for supporting a zero client according to an embodiment of the present invention.

FIG. 2 is a diagram showing the configuration of the virtual server and the virtual machine management master server for supporting a zero client according to an embodiment of the present invention.

Referring to FIG. 2, a virtual server 100 for supporting a zero client according to an embodiment of the present invention may include a virtual machine management agent unit 110 and a virtualization unit 130. The configuration of the virtual server shown in FIG. 2 conforms to an embodiment, and all the blocks of FIG. 2 are not essential components. Thus, some blocks of FIG. 2 may be added, changed, or deleted in other embodiments.

The virtual machine management agent unit 110 generates a virtual host interface resource pool 112 and a directly allocatable host interface resource pool 113 by classifying the attributes of host interface resources of the virtual server 100. Below, the detailed configuration of the virtual machine management agent unit 110 will be described.

The virtual server 100 may include the virtual machine management agent unit 110 to configure a virtual machine 120 connected to each zero client 400. That is, the virtual machine management agent unit 110 provides the function of establishing and managing the zero client 400 to the virtualization unit 130. For this, the virtual machine management agent unit 110 may include a virtual machine management agent engine 111, the virtual host interface resource pool 112, and the directly allocatable host interface resource pool 113.

The virtual machine management agent engine 111 functions to manage the allocated host interface of the virtual machine 120 while communicating with the virtualization unit 130, and is operated by receiving an instruction from the virtual machine management master server engine 210 of the virtual machine management master server 200. The virtual machine management agent engine 111 transfers the instruction to the virtual machine establishment engine 131 of the virtualization unit 130, and generates the virtual host interface resource pool 112 and the directly allocatable host interface resource pool 113 by classifying the attributes of host interface resources of the virtual server 100. In an embodiment, the virtual machine management agent engine 111 may generate a host interface resource pool by collecting the host interface information of the virtual server 100, and then generate the virtual host interface resource pool 112 and the directly allocatable host interface resource pool 113 by classifying the attributes of host interface resources in the generated host interface resource pool. In this case, the virtual machine management agent unit 110 may generate the virtual host interface resource pool in response to information related to the virtual machine installed on the virtual server, and generate the directly allocatable host interface resource pool in response to information related to a directly allocatable host interface installed on the virtual server.

The virtual host interface resource pool 112 includes information about the resources of a virtual host interface, and may include information about one or more selected from the group consisting of the number of virtual processors that can be operated by the virtual server, the size of memory allocated to each zero client, the number of disk images of the virtual machine installed on the virtual server, the number of disk partitions of the virtual machine installed on the virtual server, and the number of virtual network devices that can be generated by the virtual server.

The directly allocatable host interface resource pool 113 includes information about the resources of a directly allocatable host interface, and may include one or more selected from the group consisting of the information of a directly allocatable graphics processing device installed on the virtual server, the information of a directly allocatable USB device installed on the virtual server, the information of a directly allocatable network device installed on the virtual server, and the information of a directly allocatable sound device installed on the virtual server.

The procedure for classifying the attributes of host interface resources and generating the virtual host interface resource pool 112 and the directly allocatable host interface resource pool 113 will be described in detail later with reference to the attached drawings.

The virtual machine management agent engine 111 may transfer a virtual machine establishment instruction set, including instructions for the generation, deletion, stoppage, and resumption of the virtual machine 120, to the virtual machine establishment engine 131 of the virtualization unit 130, and may then establish the virtual machine 120.

The virtualization unit 130 receives a virtual machine establishment request from a user via the virtual machine management master server 200, and provides the host interface of the virtual machine 120 by selectively using any one of emulation mode and direct connection mode. The virtualization unit 130 may have the form of software or a kernel for operating one or more virtual machines 120.

The virtualization unit 130 may emulate a shareable host interface set 141 in a host interface layer 140, generate a virtual host interface set 132 that can be shared among the virtual machines 120, and provide the virtual host interface set 132 to the host interface of each virtual machine 120. The mode for this function is called emulation mode 101. The virtual host interface set 132 may correspond to the virtual host interface resource pool 112. In an embodiment, host interfaces that can be utilized in emulation mode 101 include a processor, a main memory device, an auxiliary memory device, a network device, a graphics processing device, a USB host controller, a sound device, etc.

However, in the case of host interfaces that duplicate large-capacity data such as for the graphics processing device, the USB device, and the sound device, or that requires the ability to exclusively use the processor for the relevant device, the load of the processor greatly increases and the performance of an application being executed using the host interface cannot be guaranteed when the device is being processed in emulation mode 101. Accordingly, the directly allocatable host interface set 142 is allocated to a specific virtual machine 120 in a 1:1 manner, so that the above problem can be solved. This mode is referred to as "direct connection mode 102."

In order to support the zero client 400 provided in the present invention, the Input/Output (I/O) signals of the directly allocatable host interface set 142 are connected to the zero client 400 using direct connection mode 102. A connection between the directly allocatable host interface set 142 and the zero client 400 will be described in detail with reference to related drawings.

The virtual machine management master server 200 for supporting the zero client according to an embodiment of the present invention generates a virtual server group resource pool 220 by collecting host interface resource information related to the virtual machine, generates a virtual machine establishment instruction set required to operate the zero client 400 in accordance with the virtual server group resource pool 220, and transmits the generated virtual machine establishment instruction set to the virtual server 100. Hereinafter, the detailed configuration of the virtual machine management master server 200 will be described in detail.

The virtual machine management master server 200 functions to manage virtual machine management agent units 110 installed on all virtual servers 100. The establishment and management of zero clients 400 connected to the virtual servers 100 are performed by the virtual machine management master server 200. The virtual machine management master server 200 includes a virtual machine management master server engine 210 and a virtual server group resource pool 220. The virtual machine management master server engine 210 is connected to all of the virtual machine management agent engines 111 over a network and is configured to collect pieces of host interface resource information related to all virtual machines for the zero clients 400 and to transfer a virtual machine establishment instruction set required to operate the zero clients 400 to the zero clients 400. In an embodiment, the host interface resource information related to the virtual machines can be collected from the virtual host interface management resource pool 112 and the directly allocatable host interface resource management pool 113 of each virtual machine management agent unit 110. The virtual machine establishment instruction set required to operate the zero clients 400 may be transferred to the virtualization unit 130 after the validity of the instructions has been verified by the virtual machine management agent engine 111.

Figure 3:
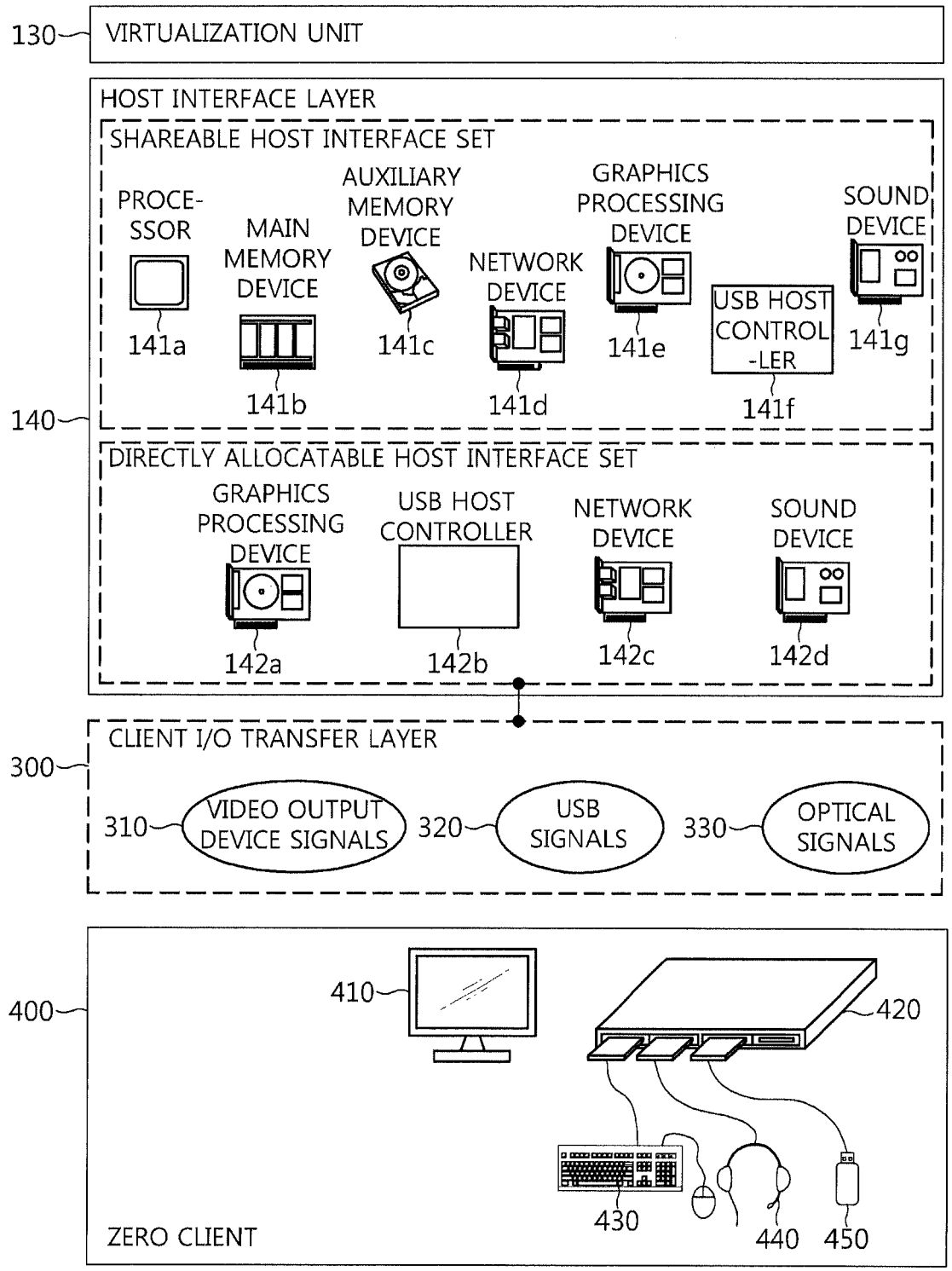
FIG. 3 is a diagram showing a structure in which the virtual server for supporting a zero client is connected to the zero client according to an embodiment of the present invention.

FIG. 3 is a diagram showing a structure in which the virtual server for supporting a zero client is connected to the zero client according to an embodiment of the present invention.

Referring to FIG. 3, in an embodiment, a shareable host interface set 141 may include one or more of a processor 141a, a main memory device 141b, an auxiliary memory device 141c, a network device 141d, a graphics processing device 141e, a USB host controller 141f, and a sound device 141g. The virtualization unit 130 at a level higher than that of the shareable host interface set 141 emulates these devices to generate a virtual host interface set 132 so that a plurality of virtual machines 120 can use the virtual host interface set 132.

In an embodiment, in order to provide zero clients 400, some of the shareable host interface set 141 can be classified as a directly allocatable host interface set 142 and then the directly allocatable host interface set 142 can be allocated to a specific virtual machine 120 in direct connection mode 102. In an embodiment, the directly allocatable host interface set 142 required to provide the zero clients 400 may include one or more of a graphics processing device 142a, a USB host controller 142b, a network device 142c, and a sound device 142d. The configuration shown in FIG. 3 is merely presented as an embodiment, and the directly allocatable host interface set 142 may further include the host interfaces of I/O devices, such as a tablet or a printer, in addition to the components of the embodiment.

In an embodiment, the zero clients 400 may include one or more of a monitor 410, a USB hub 420, a USB keyboard 430, a USB audio device 440, and a USB memory device 450. The configuration of each zero client 400 shown in FIG. 3 is merely presented as an embodiment, and may also include output devices such as a tablet, a printer, or a network device, in addition to the components of the embodiment. The I/O devices constituting the zero client 400 are physically connected to the directly allocatable host interface set 142 in the host interface layer 140 of the virtual server 100 via a client I/O transfer layer 300. In an embodiment, signals transferred to the client I/O transfer layer 300 may include one or more of video output device signals 310 such as High-Definition Multimedia Interface (HDMI) signals, Digital Visual Interface (DVI) signals, and analog signals, USB signals 320, and optical signals 330.

Figure 4:
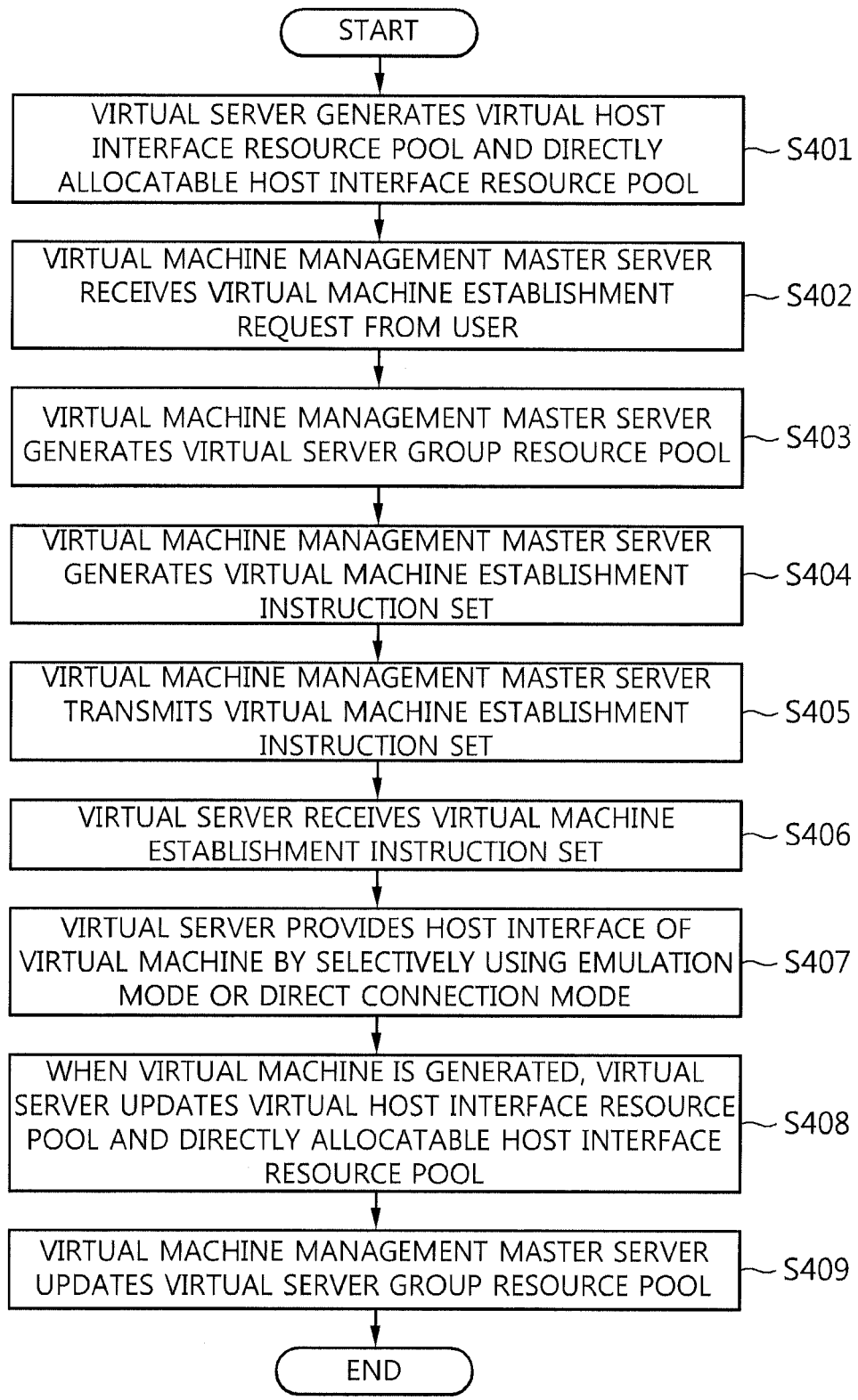
FIG. 4 is a flowchart showing a virtual machine management method for supporting a zero client according to an embodiment of the present invention.

FIG. 4 is a flowchart showing a virtual machine management method for supporting a zero client according to an embodiment of the present invention.

Referring to FIG. 4, when the virtual machine management method for supporting the zero client according to the embodiment of the present invention is initiated, the virtual server generates a virtual host interface resource pool and a directly allocatable host interface resource pool by classifying the attributes of the host interface resources of a virtual server at step S401. Further, a virtual machine management master server receives a virtual machine establishment request from a user at step S402, and generates a virtual server group resource pool by collecting host interface resource information related to a virtual machine at step S403. Further, the virtual machine management master server generates a virtual machine establishment instruction set required to operate the zero client in accordance with the virtual server group resource pool at step S404, and transmits it to the virtual server at step S405. In this case, the host interface resource information related to the virtual machine may be collected from the virtual host interface resource pool and the directly allocatable host interface resource pool of the virtual server.

When the virtual server receives a virtual machine establishment instruction set corresponding to the virtual machine establishment request of the user from the virtual machine management master server at step S406, the virtual server provides the host interface of the virtual machine by selectively using any one of emulation mode in which, of the host interfaces of the virtual server, a shareable host interface set is emulated to generate a virtual host interface set corresponding to the virtual host interface resource pool and direct connection mode in which, of the host interfaces of the virtual server, a directly allocatable host interface set corresponding to the directly allocatable host interface resource pool is connected to the zero client at step S407.

Thereafter, when the virtual machine is generated using the virtual machine establishment instruction set, the virtual server updates the virtual host interface resource pool and the directly allocatable host interface resource pool using the information about the host interface resources consumed in generating the virtual machine at step S408. The virtual machine management master server updates the virtual server group resource pool in accordance with the updated virtual host interface resource pool and the updated directly allocatable host interface resource pool at step S409.

Figure 5:
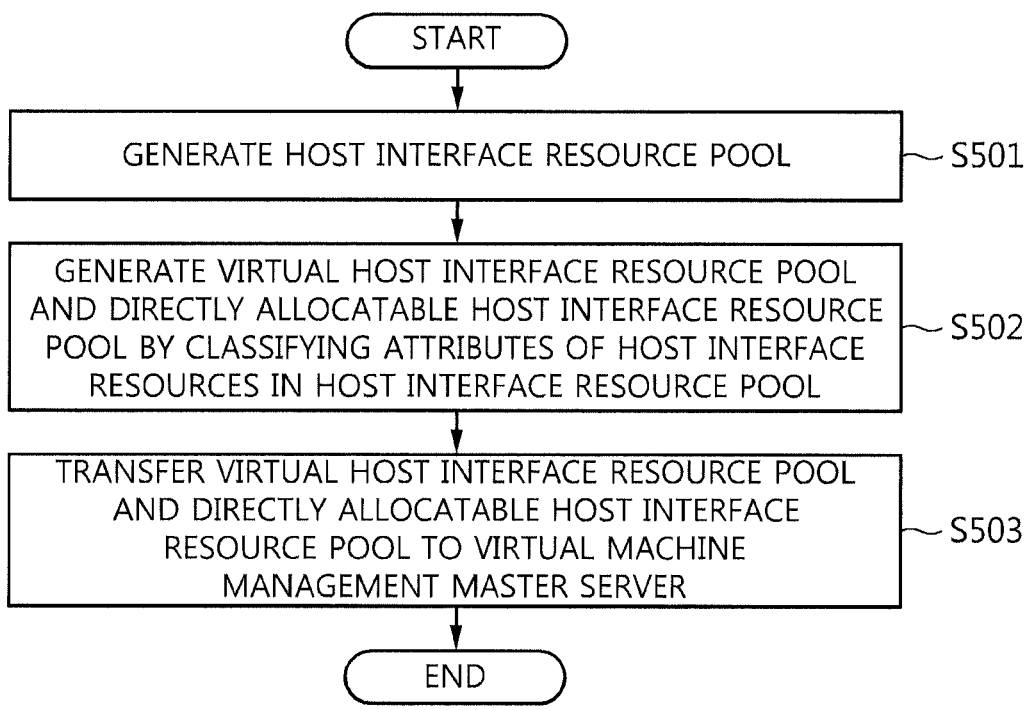
FIG. 5 is a flowchart showing a procedure in which the virtual machine management agent unit of the virtual server is initialized in the virtual machine management method for supporting a zero client according to an embodiment of the present invention.

FIG. 5 is a flowchart showing a procedure for initializing the virtual machine management agent unit of the virtual server in the virtual machine management method for supporting a zero client according to an embodiment of the present invention.

The procedure shown in FIG. 5 indicates a detailed procedure, which can be performed at the step S401 of FIG. 4, as an embodiment.

Referring to FIG. 5, when the virtual machine management agent unit is executed, it generates a host interface resource pool by collecting the host interface information of the virtual server at step S501, and performs the task of classifying the attributes of host interface resources in the generated host interface resource pool at step S502, so that a virtual host interface resource pool and a directly allocatable host interface resource pool are generated. The task performed at step S502 will be described in detail later with reference to FIG. 6. Finally, the virtual machine management agent unit transfers the information of the virtual host interface resource pool and the directly allocatable host interface resource pool to the virtual machine management master server at step S503. The virtual machine management master server stores the received information in its own virtual server group resource pool.

Figure 6:
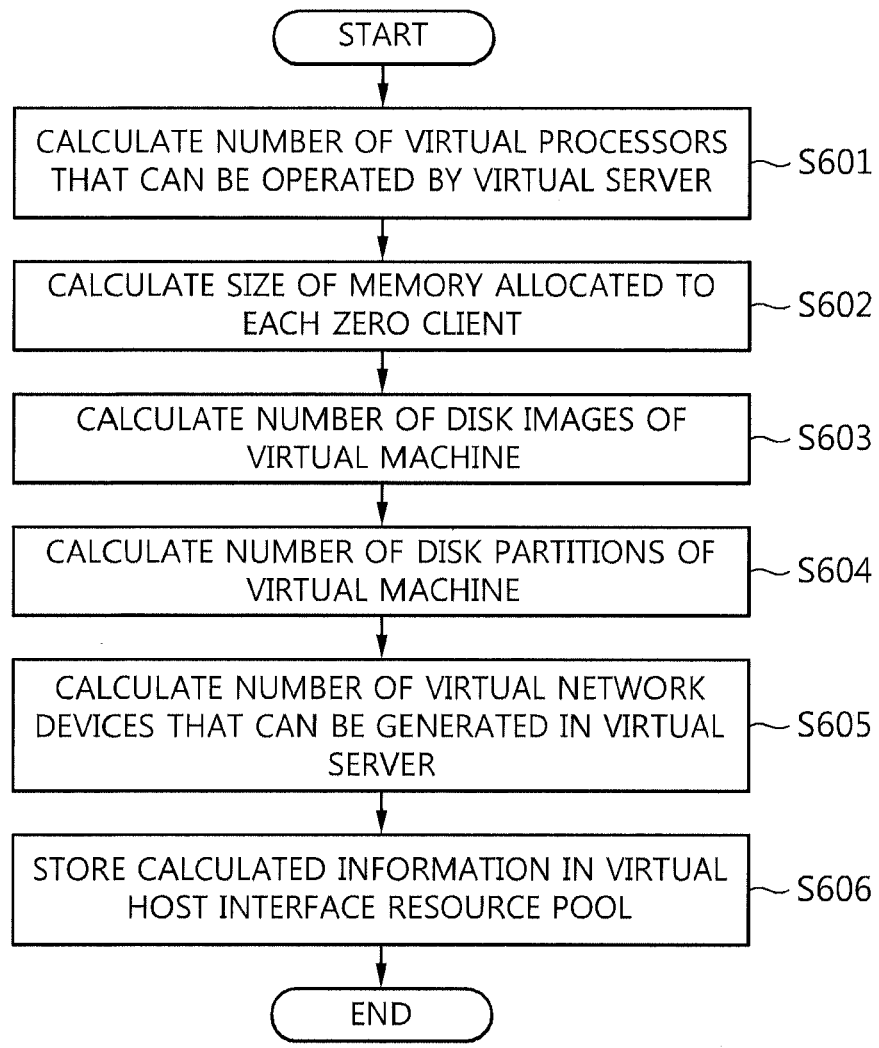
FIGS. 6 and 7 are flowcharts showing a procedure in which the virtual server classifies the attributes of host interface resources in the virtual machine management method for supporting a zero client according to an embodiment of the present invention.
Figure 7:
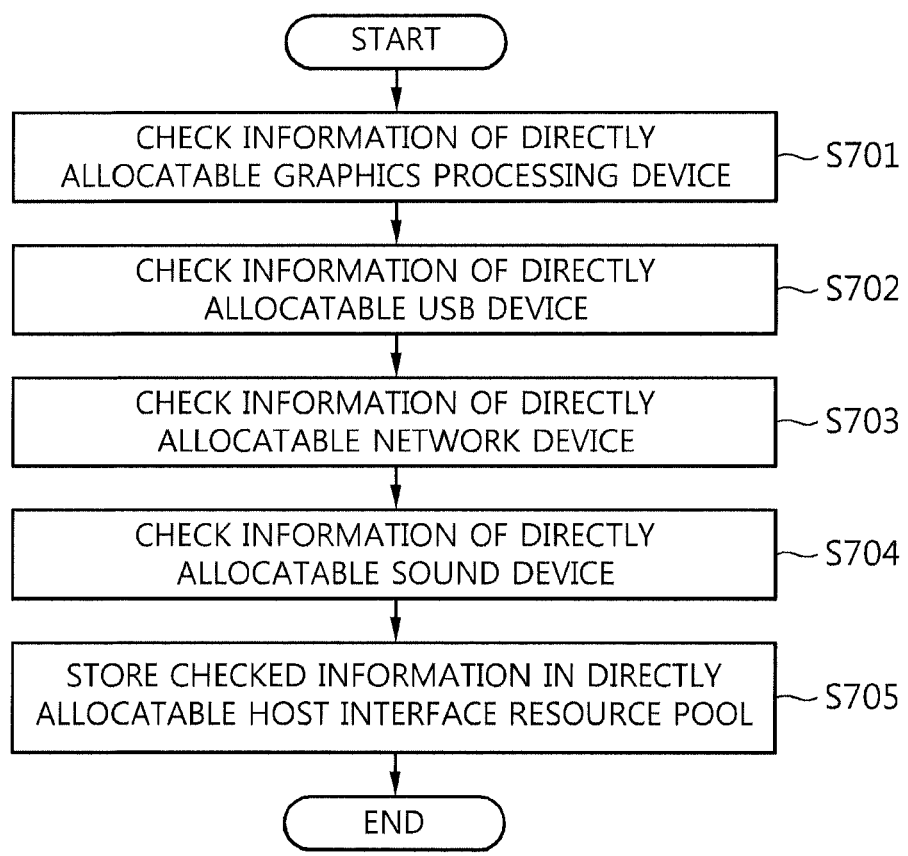

FIGS. 6 and 7 are flowcharts showing a procedure in which the virtual server classifies the attributes of host interface resources in the virtual machine management method for supporting the zero client according to an embodiment of the present invention.

FIGS. 6 and 7 illustrate detailed procedures that can be performed at the step S401 of FIG. 4 and the step S502 of FIG. 5 as embodiments. The step S502 of FIG. 5 may include the step of generating the virtual host interface resource pool in response to information related to the virtual machine installed on the virtual server, and the step of generating the directly allocatable host interface resource pool in response to information related to the directly allocatable host interface installed on the virtual server. In this case, FIG. 6 illustrates the procedure corresponding to the step of generating the virtual host interface resource pool in response to the information related to the virtual machine installed on the virtual server, and FIG. 7 illustrates the procedure corresponding to the step of generating the directly allocatable host interface resource pool in response to the information related to the directly allocatable host interface installed on the virtual server.

FIG. 6 is a flowchart showing a procedure for generating the virtual host interface resource pool in the procedure in which the virtual server classifies the attributes of host interface resources.

Referring to FIG. 6, the number of operation cores of a processor installed on the virtual server and the operating speed of each operation core are calculated, and then the number of virtual processors that can be operated by the virtual server is calculated at step S601. The size of memory to be allocated to each zero client is calculated using the size of the entire host memory installed on the virtual server at step S602. Further, the number of disk images of the virtual machine installed on the virtual server is calculated at step S603, and the number of disk partitions of the virtual machine installed on the virtual server is calculated at step S604. Furthermore, network bandwidth for each client of the network device installed on the virtual server is calculated, and then the number of virtual network devices that can be generated in the virtual server is calculated at step S605.

Thereafter, pieces of information calculated at steps S601 to S605 are stored in the virtual host interface resource pool at step S606.

FIG. 7 is a flowchart showing a procedure for generating the directly allocatable host interface resource pool in the procedure in which the virtual server classifies the attributes of the host interface resources.

Referring to FIG. 7, the information of a directly allocatable graphics processing device installed on the virtual server is checked at step S701, and the information of a directly allocatable USB device installed on the virtual server is checked at step S702. Further, the information of a directly allocatable network device installed on the virtual server is checked at step S703, and the information of a directly allocatable sound device installed in the virtual server is checked at step S704.

Thereafter, pieces of information at steps S701 to S704 are stored in the directly allocatable host interface resource pool at step S705.

Figure 8:
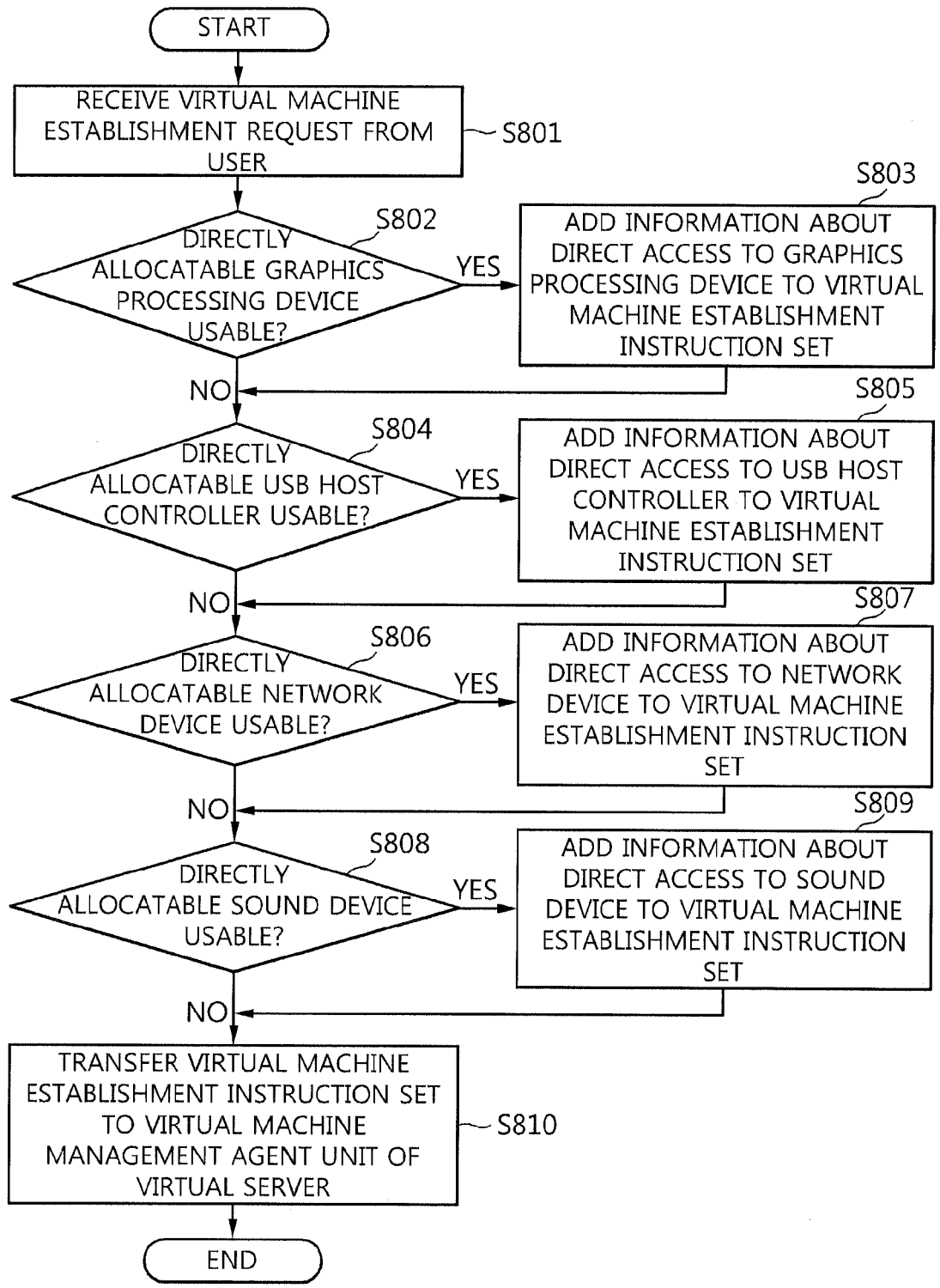
FIG. 8 is a flowchart showing an operating procedure performed when the virtual machine management master server receives a virtual machine establishment request in the virtual machine management method for supporting a zero client according to an embodiment of the present invention.

FIG. 8 is a flowchart showing an operating procedure performed when the virtual machine management master server receives a virtual machine establishment request, in the virtual machine management method for supporting the zero client according to an embodiment of the present invention.

The procedure shown in FIG. 8 corresponds to a procedure in which the virtual machine management master server of FIG. 4 generates a virtual machine establishment instruction set at step S404. That is, at step S404 in FIG. 4, the virtual machine management master server may determine whether a host interface corresponding to the virtual machine establishment request of the user is usable in the virtual server group resource pool, and may add information about direct access to the host interface to the virtual machine establishment instruction set if it is determined that the host interface is usable. A detailed procedure thereof is shown as an embodiment.

Referring to FIG. 8, the virtual machine management master server receives a virtual machine establishment request from the user at step S801. The virtual machine establishment request includes a requirement for the zero client. The requirement may include information about a directly allocatable host interface related to the performance of the zero client.

The virtual machine management master server engine of the virtual machine management master server determines whether the user's directly allocatable graphics processing device is usable in the virtual server group resource pool at step S802, and adds information about direct access to the graphics processing device to the virtual machine establishment instruction set at step S803 if it is determined that the graphics processing device is usable.

Further, the virtual machine management master server engine of the virtual machine management master server determines whether the user's directly allocatable USB host controller is usable in the virtual server group resource pool at step S804, and adds information about direct access to the USB host controller to the virtual machine establishment instruction set at step S805 if it is determined that the USB host controller is usable.

Furthermore, the virtual machine management master server engine of the virtual machine management master server determines whether the user's directly allocatable network device is usable in the virtual server group resource pool at step S806, and adds information about direct access to the network device to the virtual machine establishment instruction set at step S807 if it is determined that the network device is usable.

Furthermore, the virtual machine management master server engine of the virtual machine management master server determines whether the user's directly allocatable sound device is usable in the virtual server group resource pool at step S808, and adds information about direct access to the sound device to the virtual machine establishment instruction set at step S809 if it is determined that the sound device is usable.

The virtual machine management master server engine transfers the virtual machine establishment instruction set completed at the above-described steps to the virtual machine management agent unit of the virtual server at step S810.

Figure 9:
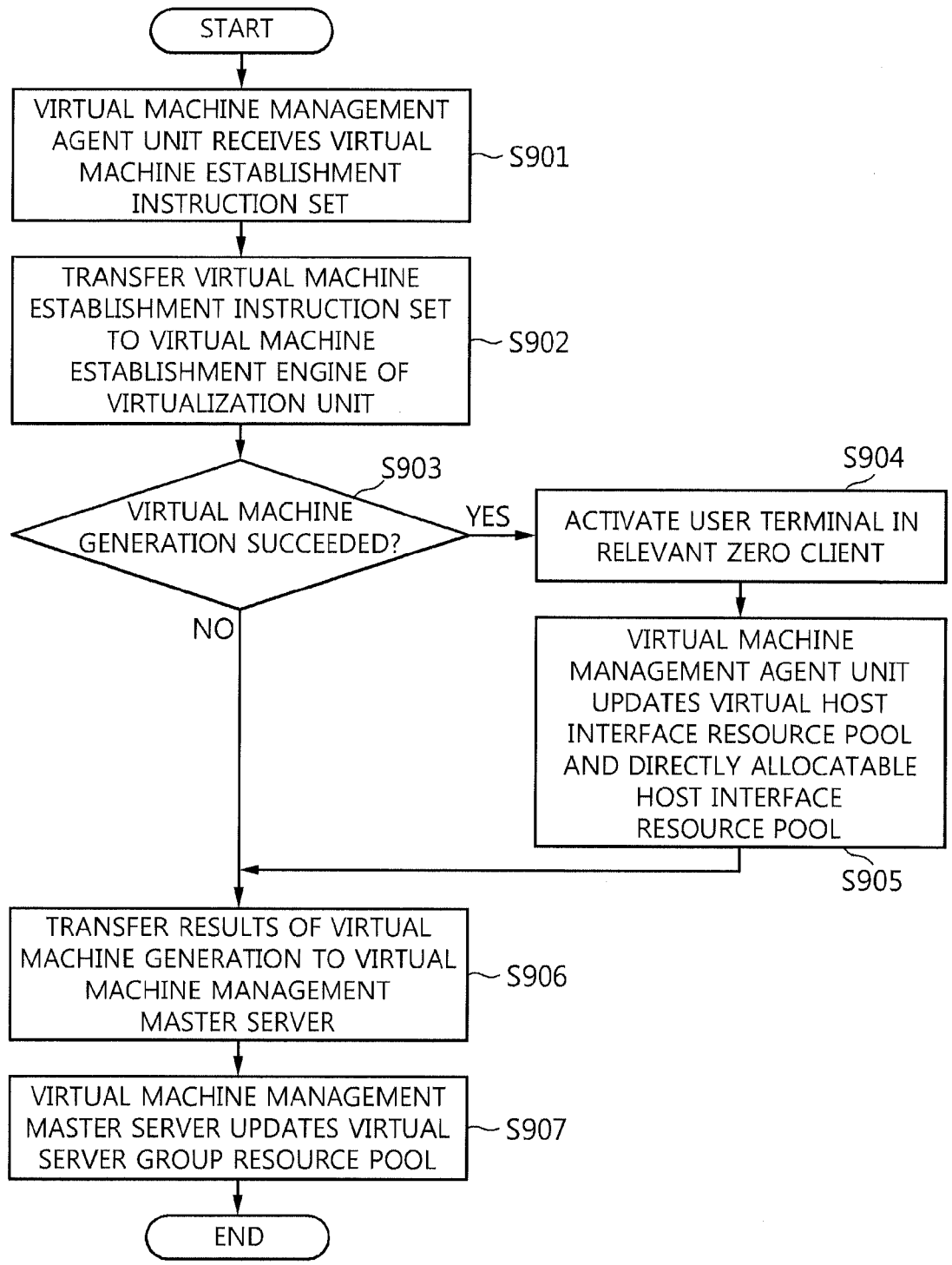
FIG. 9 is a flowchart showing an operating procedure performed when the virtual server receives a virtual machine establishment request in the virtual machine management method for supporting a zero client according to an embodiment of the present invention.

FIG. 9 is a flowchart showing an operating procedure performed when the virtual server receives a virtual machine establishment request, in the virtual machine management method for supporting the zero client according to an embodiment of the present invention.

The procedure shown in FIG. 9 indicates a detailed procedure, which can be performed at the steps S406 to S409 of FIG. 4, as an embodiment.

Referring to FIG. 9, the virtual machine management agent unit of the virtual server receives a virtual machine establishment instruction set from the virtual machine management master server at step S901.

The virtual machine management agent unit transfers the virtual machine establishment instruction set received from the virtual machine management master server to the virtual machine establishment engine of the virtualization unit at step S902.

Further, the virtual machine establishment engine determines whether the generation of the virtual machine has succeeded at step S903. If the generation of the virtual machine has succeeded, a user terminal is activated in a relevant zero client at step S904.

If the generation of the virtual machine has succeeded, the virtual machine management agent unit updates both the virtual host interface resource pool and the directly allocatable host interface resource pool using the information about the host interface resources consumed in generating the virtual machine at step S905. Further, the virtual machine management agent unit transfers the results of the generation of the virtual machine to the virtual machine management master server at step S906. The virtual machine management master server updates its own virtual server group resource pool using the received information at step S907.

The above virtual machine management method for supporting a zero client has been described with reference to the flowcharts illustrated in the drawings. Although the steps of the method have been described as being a series of blocks for the sake of simplicity of explanation, the present invention is not limited by the sequence of the blocks, and several blocks may occur either in a sequence different from that shown and described in the present specification with respect to other blocks, or simultaneously with other blocks. Further, a variety of different branches, flow paths and block sequences that achieve results identical or similar to those of the present specification may be implemented. Furthermore, all blocks shown in the implementation of the method described in the present specification may not necessarily be required.

As described above, a virtual server and a virtual machine management method for supporting a zero client in accordance with an aspect of the present invention are advantageous in that the host interface of a virtual machine is provided by selectively using any one of emulation mode in which a shareable host interface set is emulated to generate a virtual host interface set and direct connection mode in which a directly allocatable host interface set is connected to the zero client, thus serving high-end level applications such as 3D games, high-quality video, high-quality audio, and 3D graphic tasks.

Further, the virtual server and virtual machine management method for supporting a zero client in accordance with another aspect of the present invention are advantageous in that a zero client capable of being operated without requiring a separate processor, host interface, or operating system can be provided, thus greatly reducing the cost required to construct the system.

Furthermore, the virtual server and virtual machine management method for supporting a zero client in accordance with a further aspect of the present invention are advantageous in that zero clients are grouped and managed, thus realizing the excellent scalability of the zero clients and facilitating the management of the zero clients.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. These modifications, additions and substitutions should be interpreted as being included in the claims of the present invention without departing from the scope of the present invention.

What is claimed is:

1. A virtual server for supporting a zero client, comprising:
a virtual machine management agent unit to generate a virtual host interface resource pool and a directly allocatable host interface resource pool by classifying attributes of host interface resources in a host interface resource pool; and
a virtualization unit to provide a host interface of a virtual machine by selectively using one of an emulation mode in which a virtual host interface set corresponding to the virtual host interface resource pool is generated and a direct connection mode in which a directly allocatable host interface set corresponding to the directly allocatable host interface resource pool is connected to the zero client, wherein the virtual machine management agent unit is configured to generate the host interface resource pool by collecting host interface information of the virtual server, and generate the virtual host interface resource pool and the directly allocatable host interface resource pool, and wherein the classifying comprises analyzing the attributes of the host interface resources in the generated host interface resource pool, and storing the analyzed attributes in the virtual host interface resource pool and the directly allocatable host interface resource pool, respectively, and wherein the analyzing the attributes comprises calculating at least one of a number of virtual processors that can be operated by the virtual server, a size of memory allocated to each zero client, a number of disk images of the virtual machine installed on the virtual server, a number of disk partitions of the virtual machine installed on the virtual server, and a number of virtual network devices that can be generated in the virtual server.

2. The virtual server of claim 1, wherein the virtual machine management agent unit is configured to generate the virtual host interface resource pool in response to information related to athe virtual machine installed on the virtual server, and to generate the directly allocatable host interface resource pool in response to information related to a directly allocatable host interface installed on the virtual server.

3. The virtual server of claim 2, wherein the virtual host interface resource pool comprises information about one or more selected from a group consisting of the number of virtual processors that can be operated by the virtual server, the size of memory allocated to each zero client, the number of disk images of the virtual machine installed on the virtual server, the number of disk partitions of the virtual machine installed on the virtual server, and the number of virtual network devices that can be generated in the virtual server.

4. The virtual server of claim 3, wherein the directly allocatable host interface resource pool comprises the information related to the directly allocatable host interface, comprising one or more selected from a group consisting of information of a directly allocatable graphics processing device installed on the virtual server, information of a directly allocatable Universal Serial Bus (USB) device installed on the virtual server, information of a directly allocatable network device installed on the virtual server, and information of a directly allocatable sound device installed on the virtual server.

5. The virtual server of claim 1, wherein:
the virtual host interface set is generated by emulating a shareable host interface set, among host interfaces of the virtual server,
the shareable host interface set comprises one or more selected from a group consisting of a processor, a main memory device, an auxiliary memory device, a network device, a graphics processing device, a USB host controller, and a sound device.

6. The virtual server of claim 1, wherein the directly allocatable host interface set comprises one or more selected from a group consisting of a graphics processing device, a USB host controller, a network device, and a sound device.

7. The virtual server of claim 1, wherein the zero client comprises one or more selected from a group consisting of a monitor, a USB hub, a USB keyboard, a USB audio device, a USB memory device, a tablet, a printer, and a network device.

8. A virtual machine management method for supporting a zero client, comprising:

generating, by a virtual server, a virtual host interface resource pool and a directly allocatable host interface resource pool by classifying attributes of host interface resources in a host interface resource pool;

receiving, by the virtual server, a virtual machine establishment instruction set corresponding to a virtual machine establishment request of a user from a virtual machine management master server; and providing a host interface of a virtual machine interface by selectively using any one of emulation mode in which a virtual host interface set corresponding to the virtual host interface resource pool is generated and direct connection mode in which a directly allocatable host interface set corresponding to the directly allocatable host interface resource pool is connected to the zero client, wherein the generating the virtual host interface resource pool and the directly allocatable host interface resource pool comprises:

generating the host interface resource pool by collecting host interface information of the virtual server; and generating the virtual host interface resource pool and the directly allocatable host interface resource pool by classifying the attributes of the host interface resources in the host interface resource pool, wherein the classifying comprises analyzing the attributes of the host interface resources and storing the analyzed attributes in the virtual host interface resource pool and the directly allocatable host interface resource pool, respectively, and wherein the analyzing the attributes comprises calculating at least one of a number of virtual processors that can be operated by the virtual server, a size of memory allocated to each zero client, a number of disk images of the virtual machine installed on the virtual server, a number of disk partitions of the virtual machine installed on the virtual server, and a number of virtual network devices that can be generated in the virtual server.

9. The virtual machine management method of claim 8, wherein the generating the virtual host interface resource pool and the directly allocatable host interface resource pool by classifying the attributes of the host interface resources in the host interface resource pool comprises:

generating the virtual host interface resource pool in response to information related to the virtual machine installed on the virtual server; and generating the directly allocatable host interface resource pool in response to information related to a directly allocatable host interface installed on the virtual server.

10. The virtual machine management method of claim 9, wherein the generating the virtual host interface resource pool in response to the information related to the virtual machine installed on the virtual server comprises:

calculating a number of operation cores of a processor installed on the virtual server and an operating speed of each operation core, thus calculating the number of virtual processors that can be operated by the virtual server;

calculating the size of memory allocated to each zero client using a size of entire host memory installed on the virtual server;

calculating the number of disk images of the virtual machine installed on the virtual server;

calculating the number of disk partitions of the virtual machine installed on the virtual server; and calculating the number of virtual network devices that can be generated in the virtual server by calculating network bandwidth for each zero client of a network device installed on the virtual server.

11. The virtual machine management method of claim 9, wherein the generating the directly allocatable host interface resource pool in response to the information related to the directly allocatable host interface installed on the virtual server comprises:

checking information of a directly allocatable graphics processing device installed on the virtual server;

checking information of a directly allocatable Universal Serial Bus (USB) device installed on the virtual server;

checking information of a directly allocatable network device installed on the virtual server; and checking information of a directly allocatable sound device installed on the virtual server.

12. The virtual machine management method of claim 8, further comprising:

receiving, by the virtual machine management master server, the virtual machine establishment request of the user;

generating, by the virtual machine management master server, a virtual server group resource pool by collecting host interface resource information related to the virtual machine;

generating, by the virtual machine management master server, a virtual machine establishment instruction set required to operate the zero client in accordance with the virtual server group resource pool; and transmitting, by the virtual machine management master server, the generated virtual machine establishment instruction set to the virtual server.

13. The virtual machine management method of claim 12, wherein the host interface resource information related to the virtual machine is collected from the virtual host interface resource pool and the directly allocatable host interface resource pool of the virtual server.

14. The virtual machine management method of claim 12, wherein the generating the virtual machine establishment instruction set comprises:

determining, by the virtual machine management master server, whether a host interface corresponding to the virtual machine establishment request of the user is usable in the virtual server group resource pool, and adding information about direct access to the host interface to the virtual machine establishment instruction set if it is determined that the host interface is usable.

15. The virtual machine management method of claim 14, further comprising:

if the virtual machine is generated using the virtual machine establishment instruction set, updating, by the virtual server, the virtual host interface resource pool and the directly allocatable host interface resource pool using information about host interface resources consumed in generating the virtual machine.

16. The virtual machine management method of claim 15, further comprising:

updating, by the virtual machine management master server, the virtual server group resource pool in accordance with the updated virtual host interface resource pool and the updated directly allocatable host interface resource pool.

* * * * *